(12) United States Patent
Cox et al.

(10) Patent No.: US 6,920,169 B1
(45) Date of Patent: Jul. 19, 2005

(54) LASER CAVITY

(75) Inventors: Alan Michael Cox, Manchester (GB); Lawrence Anthony William Gloster, Romiley (GB); Steve Haydn Lane, Manchester (GB)

(73) Assignee: Laser Quantum Limited, Manchester (GB)

( * ) Notice: Subject to any disclaimer, the term of this patent is extended or adjusted under 35 U.S.C. 154(b) by 0 days.

(21) Appl. No.: 10/019,354

(22) PCT Filed: Apr. 25, 2000

(86) PCT No.: PCT/GB00/01601

§ 371 (c)(1),
(2), (4) Date: Apr. 5, 2002

(87) PCT Pub. No.: WO01/08274

PCT Pub. Date: Feb. 1, 2001

(30) Foreign Application Priority Data

Apr. 23, 1999  (GB) .............................................. 9909252

(51) Int. Cl.$^7$ ........................... H01S 3/083; H01S 3/081
(52) U.S. Cl. ............................................ 372/94; 372/93
(58) Field of Search ...................................... 372/93–94

(56) References Cited

U.S. PATENT DOCUMENTS

| | | | | |
|---|---|---|---|---|
| 4,110,045 A | * | 8/1978 | Smith et al. ................. 356/467 |
| 4,194,168 A | * | 3/1980 | Jarrett et al. .................... 372/94 |
| 4,272,158 A | * | 6/1981 | Johnston et al. ............. 359/484 |
| 4,933,947 A | * | 6/1990 | Anthon et al. ................. 372/34 |
| 5,022,033 A | * | 6/1991 | Hackell ........................ 372/25 |
| 5,119,383 A | * | 6/1992 | Duling et al. .................. 372/18 |
| 5,289,491 A | * | 2/1994 | Dixon .......................... 372/92 |
| 5,412,674 A | * | 5/1995 | Scheps ......................... 372/22 |
| 5,856,996 A | * | 1/1999 | Durkin et al. ................ 372/98 |
| 6,587,497 B1 | * | 7/2003 | Libby et al. .................. 372/99 |
| 6,654,392 B1 | * | 11/2003 | Arbore et al. ................ 372/20 |

OTHER PUBLICATIONS

T. Baer, "Large Amplitude fluctuations due to longitudinal mode coupling in diode–pumped intracavity–doubled Nd:YAG lasers", 1986, J. Opt. Soc. Am. B/vol. 3, No. 9/ Sep. 1986, pp. 1175–1180.

* cited by examiner

Primary Examiner—Minsun Oh Harvey
Assistant Examiner—Phillip Nguyen
(74) Attorney, Agent, or Firm—Woodard, Emhardt, Moriarty, McNett & Henry LLP

(57) ABSTRACT

A non-monolithic ring laser cavity comprising: (a) a gain medium (1); (b) a first polarization rotation element arranged to rotate the polarization of light propagating in the cavity with a predetermined handedness irrespective of the direction of propagation of the light; (c) a second polarization rotation element (7) arranged-to rotate the polarization of light propagating in the cavity with a handedness which is dependent upon the direction of propagation of the light; (d) a polarization selection element (5, 6) arranged to cause loss to light propagating in the cavity, the loss being determined by the polarization of light incident upon the polarization selection element; wherein the polarization selection element comprises at least one mirror spaced away from the gain medium (1) and arranged to reflect light at an angle displaced from the normal such that the reflectivity of the at least one mirror is sufficiently polarization dependent that the laser oscillates uni-directionally.

20 Claims, 1 Drawing Sheet

LASER CAVITY

BACKGROUND OF THE INVENTION

The present invention relates to a laser cavity, and in particular to a ring laser cavity.

Laser cavities configured as rings have been widely used to eliminate a problem known as spatial hole burning. Spatial hole burning occurs in laser cavities which allow light to propagate in opposing directions within a gain medium, for example in a linear laser cavity. Light in such a laser cavity forms a standing wave, which selectively depletes the gain medium according to the localised intensity distribution of this standing wave (spatial hole burning). The effect of the spatial hole burning is to make several longitudinal modes of the laser cavity oscillate simultaneously in a homogeneously broadened laser (which may otherwise exhibit single longitudinal mode behaviour), thereby compromising the spectral purity of the laser. This multimode behaviour can cause instabilities in laser systems that are intra-cavity doubled (T. Baer, 'Large-amplitude fluctuations due to longitudinal mode coupling in diode-pumped intracavity-doubled Nd:YAG lasers,' J. Opt. Soc. Azm B 3, 1175 (1986)).

In a ring laser, light generated by stimulated emission in the gain medium is made to propagate in one direction only around the ring, thereby preventing the formation of standing waves and avoiding the resulting spatial hole burning in the gain medium. Since there is no spatial hole burning in the gain medium, the laser may oscillate in a single longitudinal mode (provided that the gain medium is predominantly homogeneously broadened). The single longitudinal mode in an intracavity doubled, uni-directional ring laser is considerably more stable than the multiple modes seen in a conventional intra-cavity doubled laser cavity, and is significantly less sensitive to environmental changes, such as temperature fluctuations.

If light is allowed to propagate in both directions in a ring cavity, spatial hole burning can occur and the main advantages of a ring laser cavity over a linear laser cavity are lost.

In order to allow the light to propagate in only one direction around a ring laser cavity, the loss suffered by light propagating in an unwanted direction must be made greater than the loss suffered by light propagating in the preferred direction. Provided that the difference between the two losses is sufficient, the laser cavity will oscillate in the preferred direction only.

BRIEF SUMMARY OF THE INVENTION

In order to impose differing losses on light propagating in opposite directions around a ring laser cavity, it is necessary to combine three effects. These are as follows:

1) Rotation of the polarisation of the light with the same handedness (with respect to its direction of travel) whichever direction the light is propagating around the ring laser cavity (for example using a quartz plate). This is known as reciprocal rotation.
2) Right handed rotation of the polarisation of light propagating in a first preferred direction and left handed rotation of the polarisation of light propagating in an unwanted, opposite direction around the ring laser cavity (or vice-versa). This can be achieved using a Faraday rotator. This is known as non-reciprocal rotation.
3) Selective transmission of light having polarisation in a predetermined plane (for example using a Brewster-angled plate). This effect is referred to as polarisation selectivity.

In a system incorporating the above three effects, a beam propagating in the preferred direction will have its polarisation rotated away from and then back towards its initial polarisation orientation, and will be transmitted with relatively low loss by the polarisation selectivity. In contrast to this, a beam propagating in the unwanted direction will have its polarisation rotated in one direction and then further rotated in the same direction (away from the initial polarisation orientation), and will suffer a greater loss due to the polarisation selectivity.

When designing laser cavities for efficient intra-cavity doubling it is necessary to achieve a high cavity finesse to keep the loss suffered by an oscillating mode in the cavity to a minimum, since any increase of the loss will cause a corresponding decrease of finesse and, therefore, efficiency.

It is an object of the present invention to provide a ring laser cavity having a low loss.

According to the invention there is provided a non-monolithic ring laser cavity comprising:
a. a gain medium;
b. a first polarisation rotation element arranged to rotate the polarisation of light propagating in the cavity with a predetermined handedness irrespective of the direction of propagation of the light;
c. a second polarisation rotation element arranged to rotate the polarisation of light propagating in the cavity with a handedness which is dependent upon the direction of propagation of the light;
d. a polarisation selection element arranged to cause loss to light propagating in the cavity, the loss being determined by the polarisation of light incident upon the polarisation selection element;

wherein the polarisation selection element comprises at least one mirror spaced away from the gain medium and arranged to reflect light at an angle displaced from the normal such that the reflectivity of the at least one mirror is sufficiently polarisation dependent that the laser oscillates uni-directionally.

When light is reflected from a mirror at an angle displaced from the normal, the mirror may have a greater reflectivity for s-polarised light than for p-polarised light. At large enough angles of incidence, the reflectivity of a mirror will become sufficiently polarisation dependent that it can act as the required polarisation selection element such that a ring laser incorporating the mirror is forced to oscillate uni-directionally (two or more mirrors arranged to reflect at lesser angles may provide an equivalent cumulative effect). The term 'sufficiently polarisation dependent' is intended to mean that unidirectional oscillation is achieved without introducing an extra polarisation selection element into the cavity, for example a Brewster plate or a Brewster angled window at one or both ends of a gain medium. The term 'sufficiently polarisation dependent' is not intended to exclude a ring laser cavity wherein the polarisation dependent reflection of the at least one mirror is supplemented with polarisation selectivity provided by a natural polarisation preference of a gain medium in the ring laser cavity.

The invention allows the construction of a low loss, high finesse ring laser cavity, since the introduction of an extra polarisation selection element is avoided. High finesse is particularly important if the laser cavity includes a frequency-doubling element. A further advantage of the invention is that it is possible to achieve a small reflection angle on an output coupling mirror (which is often curved). This small reflection angle is beneficial because the astigmatic effects caused by the output mirror are kept to a minimum.

The ring laser cavity preferably comprises three or more mirrors, and most preferably comprises four mirrors (although more mirrors may be used). Where four or more mirrors are used, the first polarisation rotation element may comprise one mirror of the cavity located such that the point of reflection of the beam is out of the plane defined by the points of reflection of three of the other mirrors. This is known as a non-planar ring oscillator (NPRO).

Preferably, the second polarisation rotation element comprises a Faraday rotator.

Preferably, the angle of reflection of the at least one angled mirror is greater than 25 degrees. The angle is measured relative to the normal from the mirror. The angle is chosen to be greater than 25 degrees in order to provide the polarisation selectivity required by the invention.

Preferably, the angle of reflection of the at least one angled mirror is between 40 degrees and 55 degrees. High reflectivity dielectric mirrors configured to reflect at approximately 45 degrees are available commercially 'off the shelf', and these may be used to reflect with good efficiency from 40 degrees to 55 degrees.

The angle of reflection of the at least one angled mirror may be greater than 55 degrees.

The at least one angled mirror may comprise two mirrors arranged to reflect light at an angle displaced from the normal such that the cumulative reflectivity of the two mirrors is sufficiently polarisation dependent that the laser oscillates uni-directionally.

The polarisation selection element may comprise two consecutively reflecting angled mirrors.

Preferably, one of the mirrors is concave, and is arranged to reflect light at less than 8 degrees from the normal. More preferably, the concave mirror is arranged to reflect light at less than 4 degrees from the normal. This reduces the astigmatic effect of the concave mirror (which is commonly an output coupler).

Suitably, the cavity further includes a frequency doubling element arranged to double the frequency of light generated by the laser gain medium.

Suitably, the frequency doubling element comprises a crystal of Potassium Titanyl Phosphate (KTP). Alternatively, the frequency doubling element comprises a Potassium Niobate ($KNbO_3$) crystal. Alternatively, the frequency doubling element comprises a crystal of Lithium Triborate (LBO).

Preferably, the gain medium is excited by light generated by one or more semiconductor devices. A semiconductor device may for example be a laser diode.

Suitably, the light generated by the one or more semiconductor devices is directed into the gain medium such that it has an absorption profile in the gain medium which substantially corresponds to the profile of the laser mode in the gain medium.

Alternatively, the one or more semiconductor devices are arranged to direct light into the gain medium by illumination from the sides of the gain medium.

Suitably, the gain medium comprises a crystal of Yttrium Aluminium Garnet (YAG) doped with a suitable element. The doping element may be for example Neodymium. The gain medium may alternatively be Vanadate ($YVO_4$) doped with a suitable element, for example Neodymium Alternatively, the gain medium may be a material commonly known as Lanthanum Scandium Borate (LSB), doped with a suitable element, for example Neodymium.

The invention is not intended to include monolithic laser cavities. A monolithic laser cavity is a laser cavity in which an entire optical cavity is formed from a single crystal or glass element, or crystals or glass elements optically bonded together to form a laser cavity, such that intra-cavity laser light travels only through the crystal or glass elements or elements. Monolithic lasers are not suited to the generation of frequency doubled light using an intra-cavity frequency doubling element

BRIEF DESCRIPTION OF THE DRAWING

Specific embodiments of the invention will now be described by way of example only, with reference to the accompanying drawing which shows schematically a laser cavity according to the invention.

DETAILED DESCRIPTION OF THE INVENTION

Figure 1:
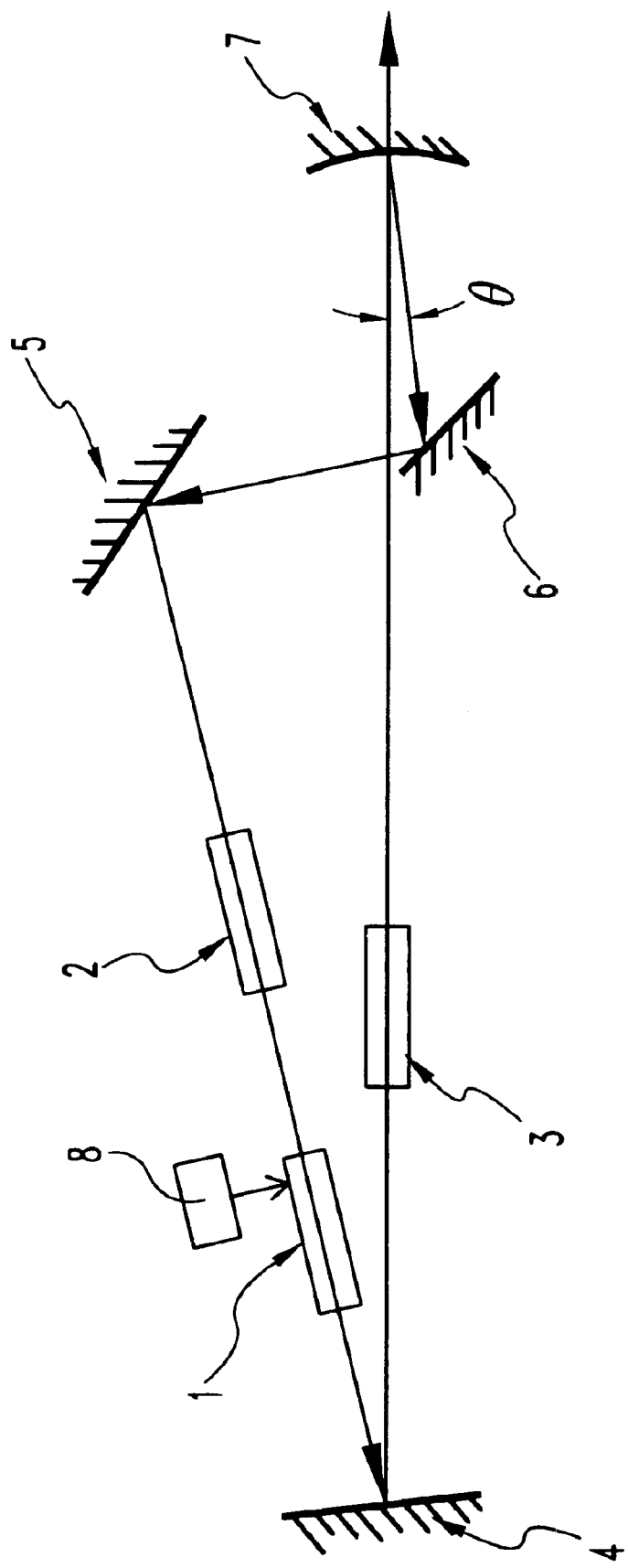

The drawing shows a first embodiment of the invention; a laser cavity comprising a gain medium 1, a Faraday rotator 2, and a non-linear crystal 3, all located in a cavity defined by four mirrors 4–7. In the illustrated embodiment the gain medium is a rod of Nd:YAG, which emits light at 1064 nm. The non-linear crystal 3 comprises a rod of Potassium Titanyl Phosphate (KTP) which is arranged to frequency-double light in the cavity from 1064 nm to 532 nm. Mirror 4 is designed to be highly reflecting at the fundamental wavelength (in this case 1064 nm). Mirrors 5 and 6 are highly reflecting at 1064 nm for a reflection angle of typically 45 degrees from the normal. Mirror 7 is highly reflecting at 1064 nm and is highly transmissive at 532 nm. In an alternative embodiment of the invention the cavity may be constructed without the non-linear crystal present In this case the mirror 7 is coated to partially transmit 1064 nm light, to allow a proportion of the 1064 nm light to be output from the cavity.

The Nd:YAG rod 1 is pumped optically using, for example, a diode laser (not shown) with sufficient intensity that laser oscillation of light at 1064 nm occurs in the cavity. The optical pump light provided by the diode laser is preferably arranged such that an absorption profile of the pump light within the Nd:YAG rod 1 is substantially matched with the profile of the laser mode in the Nd:YAG rod 1. The diode laser may alternatively be arranged to direct light into the gain medium by illumination from the sides of the gain medium (this arrangement is not preferred because it is less efficient).

A portion of the 1064 nm light (typically <0.5% per pass) is frequency doubled by the KTP rod 3, and this frequency-doubled light is emitted as a coherent beam from the output coupler 7.

At least one mirror, preferably the output coupler 7, is concave to maintain a stable oscillating mode of the laser cavity. The mirror 4 facing the output coupler 7 may also be concave.

If no directionally selective elements are included in the cavity, then oscillating modes will be able to propagate in opposite directions around the cavity, and this will lead to spatial hole burning in the gain medium 1. In order to make the light propagate in only one direction around the laser cavity, the loss suffered by light propagating in an unwanted direction is made greater than the loss suffered by light propagating in the preferred direction. The required directional selectivity is provided by a combination of the polarisation rotation caused by the Faraday rotator 2, polarisation rotation caused by locating one of the mirrors outside of a plane defined by the other three, and polarisation selectivity obtained by making two of the mirrors 5,6 reflect light at approximately 45 degrees to the normal.

The Faraday rotator 2 causes a right-hand polarisation rotation of light propagating in a preferred direction in the cavity, and causes a left-hand polarisation rotation of light propagating in an unwanted, opposite, direction. The out-of-plane nature of the cavity causes a polarisation rotation of the light which is always left-handed regardless of the direction of propagation of the light around the ring. Thus, the polarisation of light propagating in the preferred direction suffers relatively little net polarisation rotation from the combined effect of the Faraday rotator 2 and the out-of-plane nature of the cavity, whereas the polarisation of light propagating in the unwanted, opposite, direction suffers a greater net rotation.

The reflectivity of the mirrors 5,6 arranged to reflect light at 45 degrees (hereafter referred to as the angled mirrors) is typically greater for s-polarised light than it is for p-polarised light. Light which propagates around the cavity in the preferred direction, provided that it is initially s-polarised, will be relatively unaffected by the combined effect of the Faraday rotator 2 and the out-of-plane nature of the cavity, and will be reflected with high reflectivity from the mirrors 5,6. Light which propagates around the cavity in the unwanted direction, if initially s-polarised, will be rotated by the combined effects of the Faraday rotator 2 and the out-of-plane nature of the cavity, such that it has a degree of p-polarisation, and will be reflected with a lesser reflectivity from the angled mirrors 5,6.

The angled mirrors are dielectric coated mirrors, and can typically reflect s-polarised light with a loss of <0.05%, and p-polarised light with a loss of typically 1–3%. This polarisation selectivity is arranged to be sufficient to cause enough loss to light propagating in the unwanted direction that oscillation of light propagating in that direction in the cavity is suppressed. Spatial hole burning is thus suppressed and the cavity can oscillate in a single longitudinal mode as the gain medium is predominantly homogeneously broadened, The use of the two angled mirrors 5,6 is advantageous because it does not introduce significant loss into the cavity. This is particularly important when the cavity includes a frequency-doubling crystal (as shown in the drawing), because the efficiency of the frequency doubling process relies upon a high cavity finesse, which in turn is dependent upon the cavity having a low loss. In a high finesse laser cavity, the intensity of light inside the cavity can be so high that loss caused by the introduction of a polarisation selection element is unsatisfactory. Even an additional loss of 0.1%, for example due to the introduction of a Brewster plate into the cavity, may cause unacceptable deterioration of the finesse of the cavity. Ideally, most of the loss in the cavity should occur due to frequency conversion in the KTP rod 3, leading to light being usefully lost through the output coupler 7. This conversion is typically <0.5% efficient.

The angled mirrors 5,6 are manufactured to provide high reflectivity of light at around 45 degrees incidence relative to the normals of the mirrors. Mirrors of this type are readily available, and are relatively inexpensive. However, mirrors arranged to reflect light at angles other than 45 degrees may be used. In general, the reflectivity with regard to s-polarised light is easily made high at angles of incidence greater than 45 degrees, but the reflectivity of the p-polarised light is usually reduced, thereby enhancing the polarisation selectivity. In contrast to this, the polarisation selectivity is usually small for mirrors reflecting light at less than 20 degrees to the normal. At zero degrees, there is typically no appreciable selectivity at all.

Where the polarisation selectivity is enhanced, the degree of polarisation rotation induced by the Faraday rotator 2 may be reduced without compromising the unidirectional operation of the laser. This is advantageous because it allows a shorter, and therefore cheaper, Faraday rotator crystal to be used. Similarly, when the polarisation selectivity is enhanced, the degree of polarisation rotation induced by the out-of-plane cavity may be reduced.

Ideally, light propagating in the preferred direction is almost exclusively s-polarised when it is reflected by both of the angled mirrors 5 and 6.

Often, as the angle of reflection from the normal increases, it is possible to achieve lower loss for an s-polarised beam reflecting off an appropriately designed mirror. The invention is therefore advantageous because the angled mirrors 5,6 allow the reduction of losses suffered by s-polarised light.

The Faraday rotator 2 consists of a strong magnet and a material with a large Verdet constant. This constant links the polarisation rotation to the magnetic field applied to the material and the length of the crystal. Typically, the polarisation rotation introduced by the Faraday rotator 2 is a few degrees (less than 10 degrees), as is the corresponding rotation caused by the out of plane nature of the cavity. Certain gain media can also be used as Faraday rotators e.g. Nd:YAG.

The frequency doubling crystal will introduce a non-linear coupling loss of typically 0.5% in the preferred direction (y conversion from 1064 nm to 532 nm); a loss which is intensity dependent and is not present for the opposite, unwanted propagation direction The differential loss due to the polarisation control described earlier must be greater than this non-linear loss in order to ensure that the laser robustly oscillates only in the correct direction around the ring.

A further advantage of the cavity configuration shown in the drawing is that a small reflectance angle θ is subtended at the curved output coupler 7, as compared to the angle subtended in conventional ring laser cavities. The reduction of the reflectance angle θ reduces the astigmatic effect of the curved mirror 7.

It will be appreciated that the direction of polarisation rotation induced by the Faraday rotator 2 may be reversed by reversing the direction of the applied magnetic field, and that the preferred direction of propagation in the ring laser cavity may be correspondingly reversed.

The gain medium (in this example Nd:YAG) may be located between the frequency doubling crystal 3 and the minor 4.

It will be understood that the invention is not limited to ring laser cavities having a Nd:YAG gain medium, but may be applied to a ring laser cavity having any other suitable gain medium. Thee gain medium may be Vanadate ($YVO_4$) doped with a suitable element, for example Neodymium. Alternatively, the gain medium may be a material commonly known as LSB, doped with a suitable element, for example Neodymium.

Although the described embodiment of the invention includes a KTP frequency doubling element, any other suitable frequency doubling element may be used, for example a Potassium Niobate ($KNbO_3$) crystal, or a crystal of the material commonly known as LBO.

Although the described embodiment of the invention includes a diode laser operating as an optical pump, the gain medium may be excited by any suitable means.

What is claimed is:

1. A non-monolithic ring laser cavity comprising:

a. a gain medium;

b. a first polarisation rotation element arranged to rotate the polarisation of light propagating in the cavity with a predetermined handedness irrespective of the direction of propagation of the light;

c. a second polarisation rotation element arranged to rotate the polarisation of light propagating in the cavity with a handedness which is dependent upon the direction of propagation of the light;

d. a polarisation selection element arranged to cause loss to light propagating in the cavity, the loss being determined by the polarisation of light incident upon the polarisation selection element;

wherein the polarisation selection element comprises at least one mirror of the cavity spaced away from the gain medium and arranged to reflect light at an angle displaced from the normal of the at least one mirror such that the reflectivity of the at least one mirror is sufficiently polarisation dependent that the laser oscillates uni-directionally.

2. A ring laser cavity according to claim 1, wherein the cavity comprises three or more mirrors.

3. A ring laser cavity according to claim 1, wherein the cavity comprises four or more mirrors.

4. A ring laser cavity according to claim 3, wherein the first polarisation rotation element comprises one mirror of the cavity located such that the point of reflection of the beam is out of a plane defined by the points of reflection of three of the other mirrors.

5. A ring laser cavity according to claim 1, wherein the second polarisation rotation element comprises a Faraday rotator.

6. A ring laser cavity according to claim 1, wherein at least one mirror is arranged to reflect light at an angle of reflection greater than 25 degrees from the normal of that mirror.

7. A ring laser cavity according to claim 6, wherein the angle of reflection is between 40 and 55 degrees.

8. A ring laser cavity according to claim 7, wherein the angle of reflection is greater than 55 degrees.

9. A ring laser cavity according to claim 1, wherein the at least one mirror comprises two mirrors arranged to reflect light at an angle displaced from the normal such that the cumulative reflectivity of the two mirrors is sufficiently polarisation dependent that the laser oscillates uni-directionally.

10. A ring laser cavity according to claim 1, wherein one of the mirrors is concave, and is arranged to reflect light at less than 8 degrees from the normal of said mirror.

11. A ring laser cavity according to claim 10, wherein the concave mirror is arranged to reflect light at less than 4 degrees from the normal of said mirror.

12. A ring laser cavity according to claim 1, wherein the cavity further includes a frequency doubling element arranged to double the frequency of light generated by the laser gain medium.

13. A ring laser cavity according to claim 12, wherein the frequency doubling element comprises a crystal of Potassium Titanyl Phosphate.

14. A ring laser cavity according to claim 1, wherein the gain medium is excited by light generated by one or more semiconductor devices.

15. A ring laser cavity according to claim 14, wherein the light generated by the one or more semiconductor devices is directed into the gain medium such that it has an absorption profile in the gain medium which substantially corresponds to the profile of the laser mode in the gain medium.

16. A ring laser cavity according to claim 14, wherein the one or more semiconductor devices is arranged to direct light into the gain medium by illumination from the sides of the gain medium.

17. A ring laser cavity according to claim 1, wherein the gain medium comprises a crystal of Yttrium Aluminium Garnet (YAG) doped with a suitable element.

18. A ring laser cavity according to claim 1, wherein at least two mirrors are spaced away from the gain medium.

19. A ring laser cavity according to claim 18, wherein at least three mirrors are spaced away from the gain medium.

20. A ring laser cavity according to claim 1, wherein the difference in optical loss upon reflection for s-polarised light and p-polarised light at least one mirror is between one percent and three percent.

* * * * *